(No Model.)
L. R. TABOR.
PROCESS OF EVAPORATING SIRUP.
No. 457,097. Patented Aug. 4, 1891.
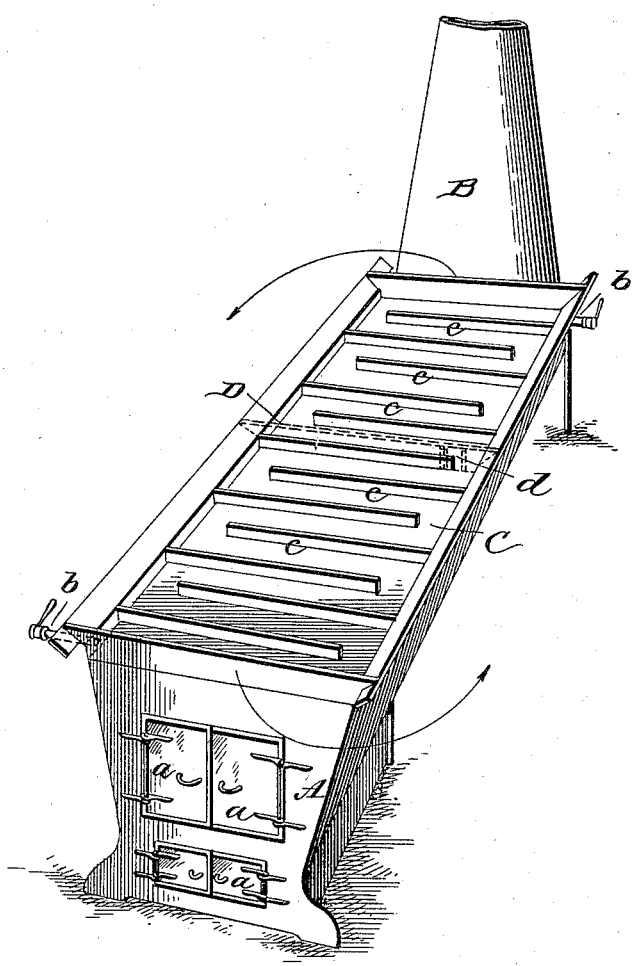

UNITED STATES PATENT OFFICE.

LORIN R. TABOR, OF WESTFORD, ASSIGNOR TO THE VERMONT FARM MACHINE COMPANY, OF BELLOWS FALLS, VERMONT.

PROCESS OF EVAPORATING SIRUP.

SPECIFICATION forming part of Letters Patent No. 457,097, dated August 4, 1891.

Application filed November 20, 1890. Serial No. 372,031. (No model.)

*To all whom it may concern:*

Be it known that I, LORIN R. TABOR, a citizen of the United States, residing at Westford, in the county of Chittenden, State of Vermont, have invented certain new and useful Improvements in Processes of Evaporating Sirup, of which the following is a specification, reference being had therein to the accompanying drawing.

This invention relates to an improved process of making sirup and the object thereof is to overcome the trouble that arises from using the evaporator in evaporating sap into sirup and sugar. There is a sediment that deposits itself in the sirup end of an evaporator after the sap gets evaporated, so as to make sirup weighing from nine to ten pounds to the gallon, and up along. If this is not removed, it injures the evaporator, making it more liable to burn, injures the product, keeping it from being made so light in color, and deadens the flavor to a certain extent.

It is well known that maple-sap contains malic acid and also lime, and when the sap is reduced to sirup of about ten pounds density per gallon and upward the malic acid and lime precipitate and form what is known as "malate of lime." It has been found that often from one day's use of an evaporator there is so much of this deposit on the bottom of the pan that it retards evaporation, is extremely liable to burn on, and then injures the product very materially. I overcome this difficulty by reversing the evaporator or the flow of the sap through the same, the new raw sap serving to dissolve and loosen up the deposit, and it is carried along and drawn out in the first outflow of sirup, and it can then be strained out of the sirup by any of the known ways of straining the sirup.

Other objects and advantages of the invention will hereinafter appear, and the novel features thereof will be specifically defined by the appended claim.

I have shown in perspective one form of apparatus by which the process may be carried out.

In the drawing, A designates the furnace, which may be of any of the preferred forms suited to the purpose, being provided with doors $a$ and smoke-flue B. The arch may be supported in any desired manner, and the evaporator-pan may be supported upon the furnace and arch in any way so as to be readily removed and reversed—that is, turned end for end.

The pan C is provided with a discharge or outlet opening or pipe $b$ at each end, said openings being controlled by suitable cocks or valves. The pan is provided also with transverse strips $c$, which terminate alternately at a distance from the side walls of the pan, as shown, so as to form a circuitous or tortuous channel or passage for the sap from one end of the pan to the other. The pan may be divided into two or more compartments by transverse partition or partitions D, as shown by dotted lines, each partition being provided with an adjustable gate $d$ to govern the flow of the sap from one compartment to the other.

In practice the new raw sap is introduced into the pan in any preferred manner at one end and allowed to flow toward the other end. After the evaporator has been used until the malate of lime begins to deposit, (say, for instance, one day,) the inflow of sap is reversed either by reversing the pan—that is, turning it end for end—or the regulator changed to the opposite end, and the new raw sap acts upon the deposit and dissolves and loosens it, so that it will be carried to the finishing-off end of the pan, where it will flow off with the sirup, from which it can be strained in any of the known ways. By this process I obtain a much finer product than heretofore, with less liability of burning and with less attention on the part of the operator.

What I claim as new is—

The process of evaporating maple-sirup, which consists in running the raw sap over an evaporator until the malate of lime begins to be deposited at the discharge end and afterward reversing the flow of the raw sap in the evaporator, whereby the deposit of malate of lime is removed, substantially as described.

In testimony whereof I affix my signature in presence of two witnesses.

LORIN R. TABOR.

Witnesses:
JOHN B. ALFRED,
A. B. BEEMAN.